United States Patent [19]

Allman et al.

[11] Patent Number: 5,113,323
[45] Date of Patent: May 12, 1992

[54] VEHICLE LAMP GUARDS

[75] Inventors: Peter N. Allman, Derbyshire; Keith J. Riley, Derby, both of England

[73] Assignee: ASG (Accessories) Limited, Derby, England

[21] Appl. No.: 581,523

[22] Filed: Sep. 11, 1990

[30] Foreign Application Priority Data

Sep. 12, 1989 [GB] United Kingdom ............... 8920563

[51] Int. Cl.$^5$ ........................... B60Q 1/00; F21V 15/00
[52] U.S. Cl. ........................................ 362/80; 362/376
[58] Field of Search ................................ 362/80, 376

[56] References Cited

U.S. PATENT DOCUMENTS 1,884,228  10/1932  Raskin .................... 362/376 X
3,005,089  10/1961  Robbins ........................ 362/80

FOREIGN PATENT DOCUMENTS 3529912  10/1986  Fed. Rep. of Germany.

*Primary Examiner*—Allen M. Ostrager
*Attorney, Agent, or Firm*—Jones, Day, Reavis & Pogue

[57] ABSTRACT

A vehicle lamp guard 10 is formed of spaced parallel flat bars 12 interconnected at the respective ends by straps 18, 20. The guard can be secured at the rear of a vehicle by a quick release fastener associated with the strap 20. A pair of pins 24 are provided at the side of the strap 18 remote from the bars 12 and are adapted to snap fit into a channel of a profiled strip 22. The latter can be bonded to the side of the vehicle and thereby provide for quick and easy fixing and release of the lamp guard while enhancing the aesthetic appearance thereof.

7 Claims, 3 Drawing Sheets

VEHICLE LAMP GUARDS

This invention relates to a guard arrangement for use with a vehicle lamp

Various designs of lamp guards are available as motor vehicle accessories for use with both front and rear lamps, particularly for "off the road" type vehicles such as Land Rovers and Range Rovers. Such guards are mounted on the respective vehicle bodies by fixing arrangements which can often be aesthetically undesirable and awkward to operate, for example when it is required to remove the lamp guards for cleaning of the lamps.

According to the present invention there is provided a guard arrangement for a vehicle lamp, the arrangement comprising guard means adapted to extend in use across the surface area of the lamp when the latter is positioned on a body of the vehicle, means for mounting one side of the guard means on the vehicle body, means for releasably locating the opposed side of the guard means, and means for attaching the locating means to the vehicle body.

Preferably the locating means comprises a profiled strip, for example a rubber extrusion. The strip may take the form of a channel in cross section with at least one leg of the channel being resiliently deflectable. Advantageously the locating means can be bonded to the vehicle body, and the bonding may be by means of double-sided adhesive tape.

The guard means may be defined by a plurality of spaced parallel bars which are horizontal in use, and the ends of the bars may be interconnected at each side of the guard means by a respective strap. The mounting means may comprise a fixing extending through the respective strap at said one side of the guard means, with the fixing being operatively engagable with an attachment on the vehicle body. The bars may be shaped to be complementary to the profile of the vehicle body at the location of the vehicle lamp. The bars may be spaced in such a relationship relative to the vehicle lamp as to ensure sufficient passage of light through the guard means when the lamp is operative to comply with appropriate regulations.

Preferably a pair of projecting pins are provided on the guard means, for example projecting inwardly of the outermost bars which may extend beyond the respective strip.

The strip may include means for mounting same on a vehicle body, and means for locating, in the strip, projections provided on the guard means. The mounting means comprise a member fixedly secured within the strip and providing a plurality of through holes accessible from externally of the strip, fixing means being engagable through the holes and the vehicle body to mount the strip thereon. Further, the projection locating means can comprise a plurality of recesses in a side of the strip into which can locate respective ones of the projections on the guard means.

An embodiment of the present invention will now be described by way of example only, with reference to the accompanying drawings, in which.

Referring to FIGS. 1 to 5 of the drawings, the design of motor vehicle lamp guard shown is for use with a rear lamp of a Land Rover vehicle.

Figure 1:
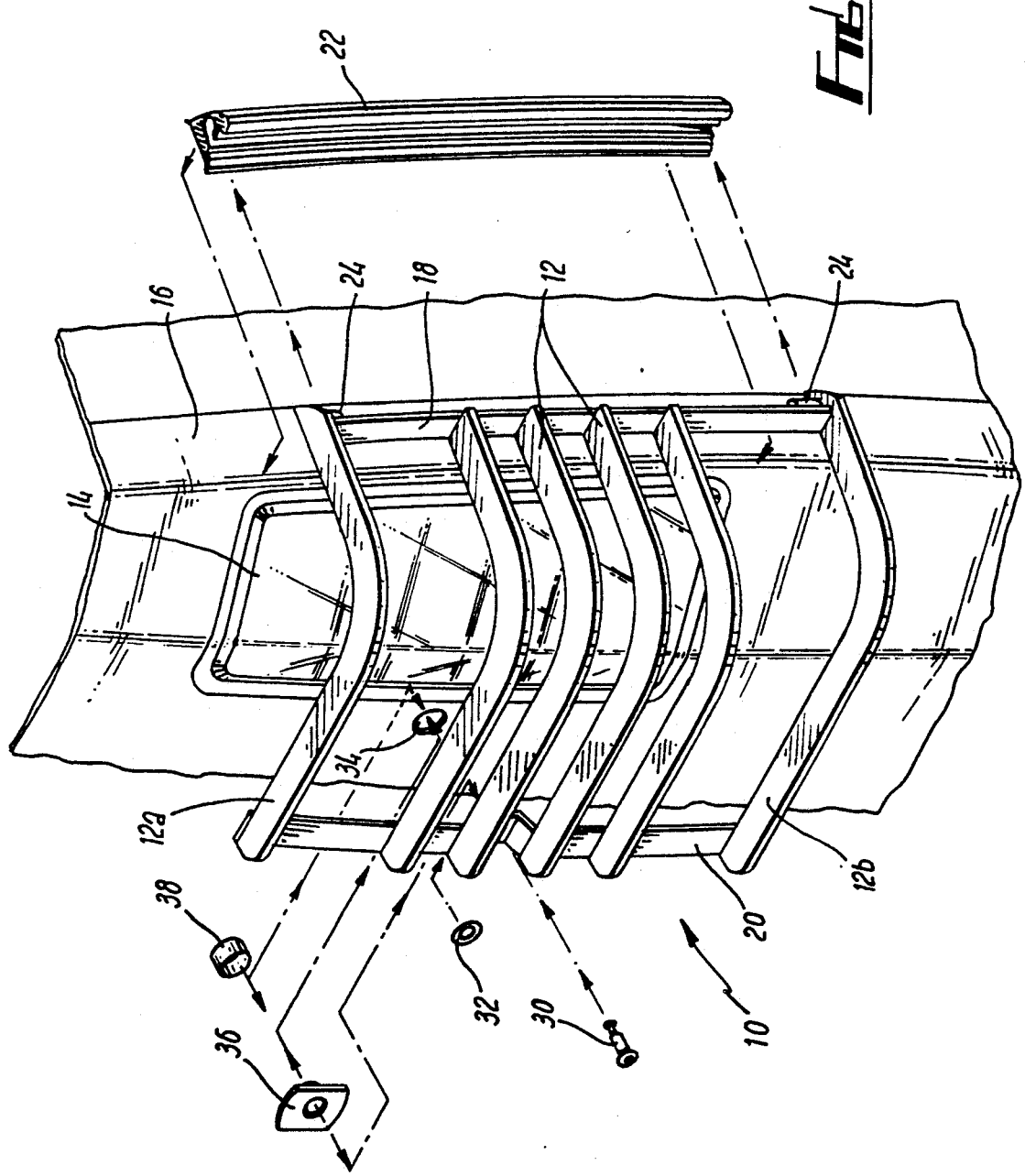
FIG. 1 is an exploded view in perspective of a lamp guard arrangement according to a first embodiment of the present invention and a respective part of a vehicle body.
Figure 2:
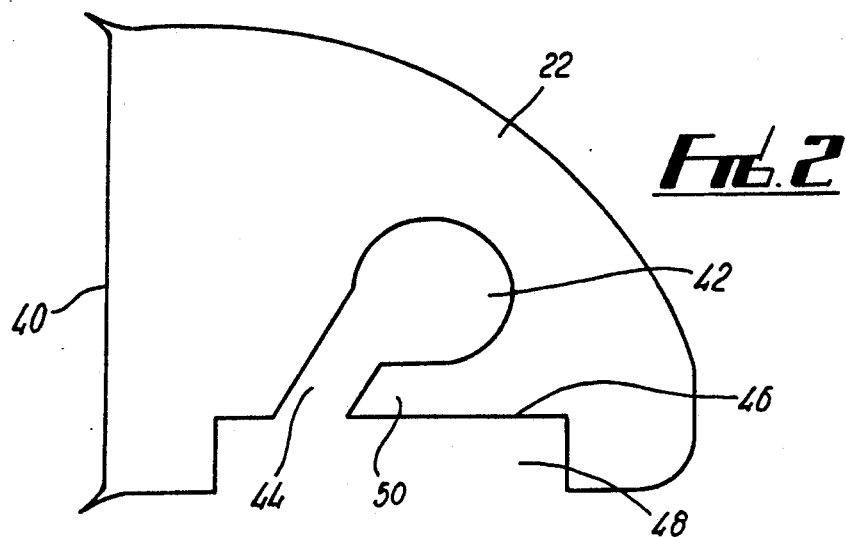
FIG. 2 is an end view of a component of the lamp guard arrangement of FIG. 1.
Figure 3:
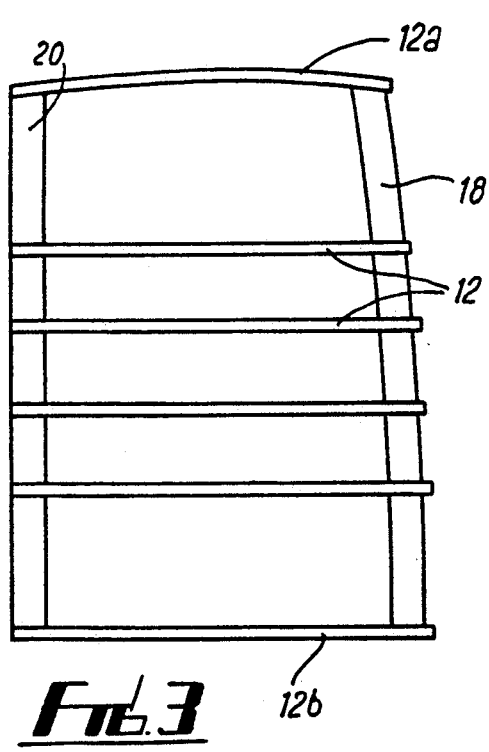
FIG. 3 is a front elevation of the guard.
Figure 5:
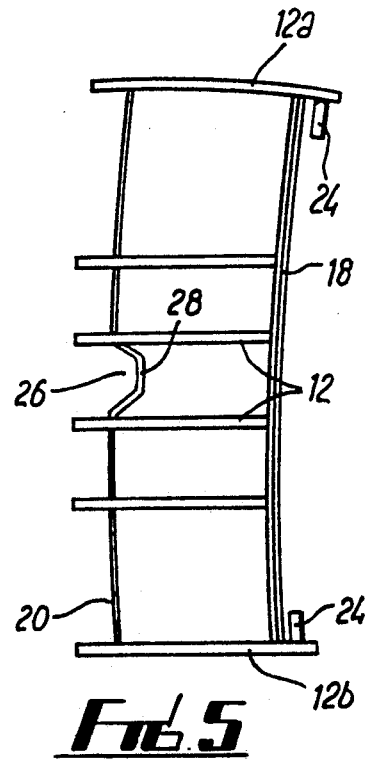
FIG. 5 is an end view of the guard.
Figure 4:
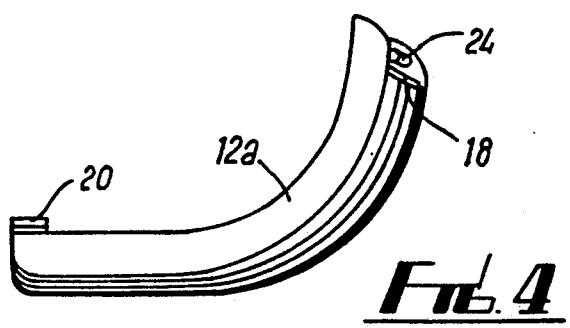
FIG. 4 is a plan view of the guard.
Figure 6:
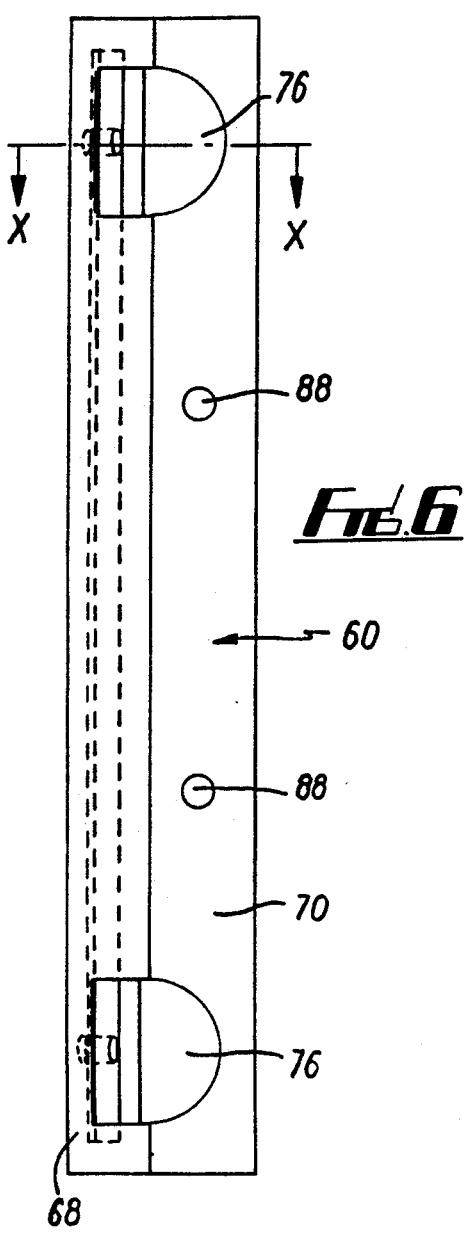
FIG. 6 is a side elevation of a component of a lamp guard arrangement according to a second embodiment of the invention.
Figure 8:
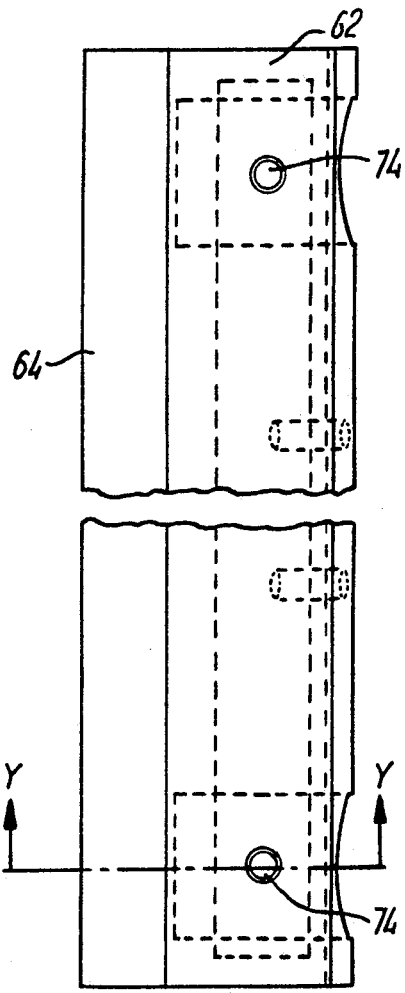
FIG. 8 is a view in the direction of arrow A.
Figure 7:
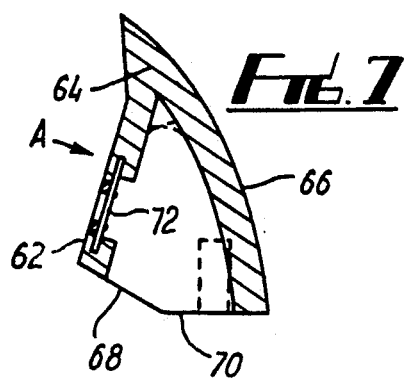
FIG. 7 is a section on X—X of FIG. 6.
Figure 9:
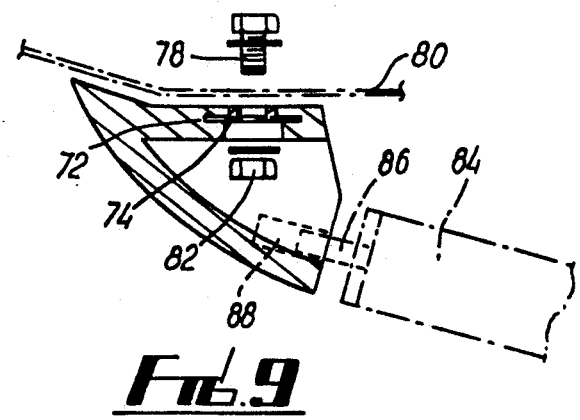
FIG. 9 is a section on Y—Y of FIG. 8 showing the component in use.

A guard 10 is formed of six spaced parallel flat bars 12 which, as shown in FIG. 1, extend horizontally in use. The spacing of a top one 12a and a bottom one 12b from the remaining bars 12 differs from the spacing between the remaining bars 12 themselves, the spacing being so designed in accordance with the vehicle lamp 14 as to ensure that sufficient light from the lamp 14 can pass through the guard 10 in accordance with relevant regulations. The longitudinal shapes of the bars 12 follow the profile of the vehicle body 16 so that the guard 10, when mounted on the vehicle body 16, can extend across the surface area of the lamp 14 both horizontally and vertically. At each side of the guard 10 the respective ends of the bars 12 are interconnected by a respective strap 18,20. The bars 12 each have an arcuate shape whereby the guard 10 can be secured at the rear of the vehicle with the use of the strap 20, and be secured to the side of the vehicle by means of a profiled strip 22. The bars 12a, 12b each extend beyond the interconnecting strap 18 and provide a pair of projecting pins 24 extending inwardly of the respective bars.

For mounting on the rear of the vehicle, the strap 20 is profiled to have an inwardly turned section 26 at a substantially central location. The section 26 provides a mounting flat 28 in which there is provided a through hole locating a first component 30 of a quick release fastener. The component 30 is retained on the strap 20 by means of a washer 32. At an appropriate location on the vehicle body 16 there is formed a through hole 34. A plate 36 provides a mounting for a second component 38 of the quick release fastener, the plate 36 being secured to the vehicle body 16, for example by bonding, whereby to locate the component 38 on the vehicle. The components 30,38 are operatively engagable when the guard 10 is positioned on the vehicle body 16 to secure the respective side of the guard 10 to the vehicle. A suitable key (not shown) can be provided for releasing the engagement between the components 30,38.

The strip 22 may be formed as a rubber extrusion, and has a planar face 40 which is adapted to be mounted at an appropriate location on the vehicle body 16, for example by bonding, preferably by the use of a strong doublesided adhesive tape. The strip 22 is of channel shape in cross section, providing a substantially circular channel 42 opening through a mouth 44 onto a side face 46. When the strip 22 is mounted on the vehicle the face 46 is adjacent the respective end of the guard 10. The face 46 is provided with a recess 48 into which the channel mouth 44 opens, the design of the strip 22 being such that at least a leg 50 of the channel is resiliently deflectable.

To locate the guard 10 in the strip 22, the respective end of the guard 10 is offered to the face 46 of the strip 22 whereby the pins 24 can pass through the channel mouth 44 with any necessary deflection of the leg 50 and snap fit into the channel 42 to be retained on the strip 22. The strip 18 can locate in the recess 48 whereby the profiled strip 22 extends along the end of the guard 10 and, as well as providing a secure location for the guard, provides an aesthetically pleasing end cover therefor. To remove the guard 10, for example for cleaning of the lamp 14, requires only release of the quick fastener by the key and then pulling of the pins 24 out of the channel 42 by deflection of the channel leg 50.

There is thus provided a lamp guard arrangement which is aesthetically pleasing with the shapes of the bars 12 and the straps 18,20 being as shown in the various Figures of the drawings in order to complement the vehicle body profile. The profiled strip provides for secure location of the guard but also quick and easy fixing and release of the guard while enhancing the aesthetic appearance.

It is to be appreciated that the shapes of the components of the guard 10 can differ depending on the vehicle in respect of which the guard is to be used, although the profiled strip 22 is likely to be usable with all such guards. The profiled strip may of course be formed from other than a rubber extrusion and other fixing means may be provided as an alternative to the quick release fastener described and shown. The spacing of the bars 12 may also differ depending on the design of lamps used by different vehicles but generally it is desirable that the spacing be such as to provide for sufficient light passing through the guard to be in accordance with the relevant regulations.

In an alternative embodiment as shown in FIGS. 6 to 9, a profiled elongate strip 60 may be formed as a moulded component. The strip 60, in transverse cross-section, has one planar side 62 with a resilient projecting lip 64 at one edge, the lip 64 forming one end edge of an arcuate side 66. The other edges of the sides 62, 66 are connected to respective edges of planar sides 68, 70 which connect together at their other edges defining an obtuse angle therebetween. The strip 62 has incorporated therein, to extend substantially parallel to but inwardly spaced from the side 62 thereof, a mounting plate 72. The latter provides a pair of spaced, lined through holes 74 which are accessible from externally of the strip 60. Cut outs 76 are provided across the sides 68, 70 of the strip 60 at the locations of the through holes 74 to provide access to the inner side of the mounting plate 72. The strip 60 is securely mounted on a vehicle body by means of bolts 78 extending through a respective body panel 80 and the through holes 74 in the mounting plate 72, locking nuts 82 being located, by way of the cut outs 76, on the free ends of the bolts 78 and tightened thereon. The lip 64 seals against the panel 80.

A guard 84, of generally the same configuration as the guard of the first embodiment, is provided with a pair of projecting pins 86 extending from the side of the respective end strap remote from the horizontal bars, instead of the pins 24. A pair of blind holes 88 are provided in the side 70 of the profiled strip which faces the guard 84 in use, so that the guard 84 can be located in the strip 60 by positioning the projecting pins 86 in the respective blind holes 88.

Again there is provided an aesthetically pleasing arrangement wherein the guard can be securely located by a quick and easy fixing, but can also be quickly and easily released.

We claim:

1. A vehicle lamp guard having at least a pair of spaced-apart straps and a plurality of spaced-apart bars spanning said straps, at least a pair of said bars extending over and past at least one of said straps to define bar extensions, a pair of spaced-apart projections on said bar extensions and extending generally toward one another for cooperation with a locating member attachable to a vehicle body for releasably mounting said guard to a vehicle body.

2. A vehicle lamp guard having a pair of spaced-apart projections extending therefrom, locating means attachable to a vehicle body for cooperation with said projections for releasably mounting said guard to a vehicle body, said locating means comprising an elongated member having holes therein for releasably receiving said projections, said elongated member being of elastomeric material and having an elongated longitudinal channel defining said holes, a deformable leg defining a narrowed lateral entrance opening to said channel, said projections being snappable into and out of said channel through said narrowed lateral entrance opening by deformation of said leg.

3. A vehicle lamp guard having opposite guard sides positionable on opposite sides of a vehicle lamp with said guard sides extending generally vertically, releasable fastening means for releasably fastening one of said guard sides to a vehicle body, retaining means mountable to a vehicle body for cooperation with said guard, cooperating means between said retaining means and the other of said guard sides for preventing separation between said retaining means and said other guard sides when said fastening means is engaged and for providing separation of said other guard side from said retaining means when said fastener means is released, said retaining means comprising an elongated member, said cooperating means comprising projections extending from said other guard side, and openings in said elongated member for releasably receiving said projections.

4. The guard of claim 3 wherein said elongated member includes deformable means for providing narrowed entrance passages to said openings, said deformable means being deformable to provide movement of said projections in and out of said openings with snap action.

5. The guard of claim 3 wherein said projections extend toward one another generally parallel to said other side.

6. The guard of claim 3 wherein said projections extend parallel to one another generally perpendicular to said other side.

7. A vehicle lamp guard comprising a pair of spaced-apart side straps positionable generally vertically on opposite sides of a vehicle lamp, a plurality of vertically-spaced substantially horizontal bars extending across said straps, and a pair of spaced-apart pins extending outwardly adjacent one of said straps, retaining means for cooperation with said pins for releasably attaching the guard to a vehicle body, said retaining means comprising an elongated member having mounting means thereon for mounting same to a vehicle body, said elongated member having openings therein for releasably receiving said pins.

* * * * *